United States Patent [19]

Schmidt

[11] 4,152,979

[45] May 8, 1979

[54] LID UNIT FOR A REFUSE COMPACTOR

[75] Inventor: Lewis W. Schmidt, Rio Vista, Calif.

[73] Assignee: Blackwelders, Rio Vista, Calif.

[21] Appl. No.: 914,788

[22] Filed: Jun. 12, 1978

[51] Int. Cl.[2] ........................ B30B 1/32; B30B 15/00; F16P 7/00

[52] U.S. Cl. ...................................... 100/53; 100/100; 100/218; 100/233; 100/255; 100/269 R; 220/1 T; 220/331; 220/334; 414/406; 414/424

[58] Field of Search ................ 100/100, 233, 53, 218, 100/269 R, 255; 214/83.3, 302, 317; 220/1 T, 331, 334

[56] References Cited

U.S. PATENT DOCUMENTS

| | | | |
|---|---|---|---|
| 3,301,414 | 1/1967 | Clar | 214/41 R |
| 3,625,140 | 6/1970 | Glanz | 100/100 |
| 3,680,478 | 8/1972 | Beachner | 100/233 |
| 3,709,389 | 1/1973 | Steltz | 214/302 |
| 3,739,715 | 6/1973 | Ambrose | 100/100 |
| 3,861,298 | 1/1975 | Melos | 100/218 |
| 3,961,573 | 6/1976 | Schmidt | 100/100 |

*Primary Examiner*—Billy J. Wilhite

*Attorney, Agent, or Firm*—Roger B. Webster

[57] ABSTRACT

A lid unit for a refuse compactor which includes a bin having a power-actuated compacting blade therein; the lid unit comprising a flat, dual-section lid supported on the bin in normally closing relation thereto, the lid embodying a front section and a rear section transversely hinged together at adjacent edges, the lid being longitudinally shiftable a limited distance on the bin to different selective positions, and instrumentalities provided between the lid and the bin arranged to prevent opening of either of the lid sections when the lid is in one position, to permit the front lid section only to be opened when the lid is in a second position, and to permit the rear lid section to be folded onto the front lid section and the folded-together sections then swung to depend in front of the bin when the lid is in a third position. The prevention of opening of either of the lid sections is for safety during operation of the compacting blade; the opening of only the front lid section is for the purpose of depositing refuse into the bin; and the folding of the lid sections and, as folded, their dependency in front of the bin is to allow the then open-top bin to be engaged and partially inverted for dumping into a hauling truck.

15 Claims, 9 Drawing Figures

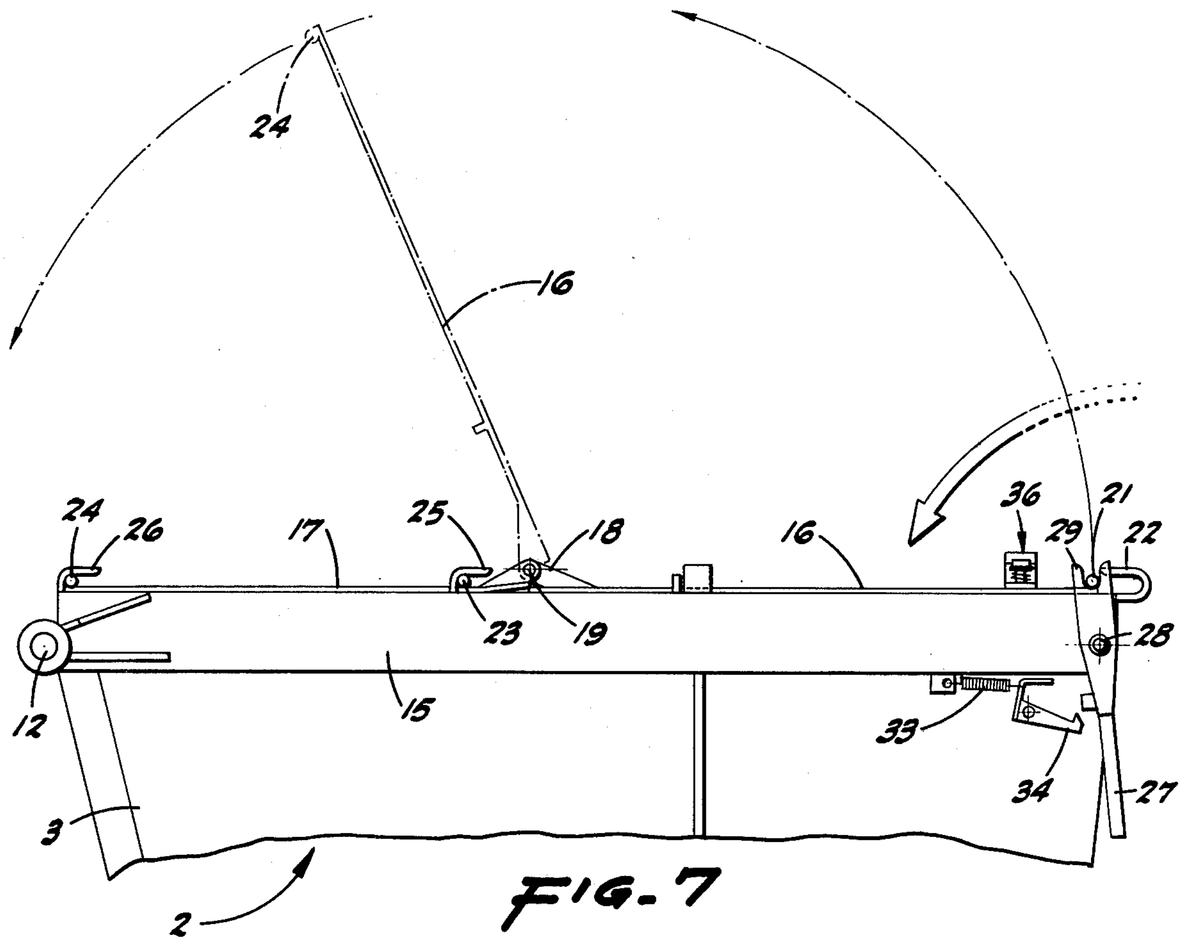
FIG-7
FIG-8
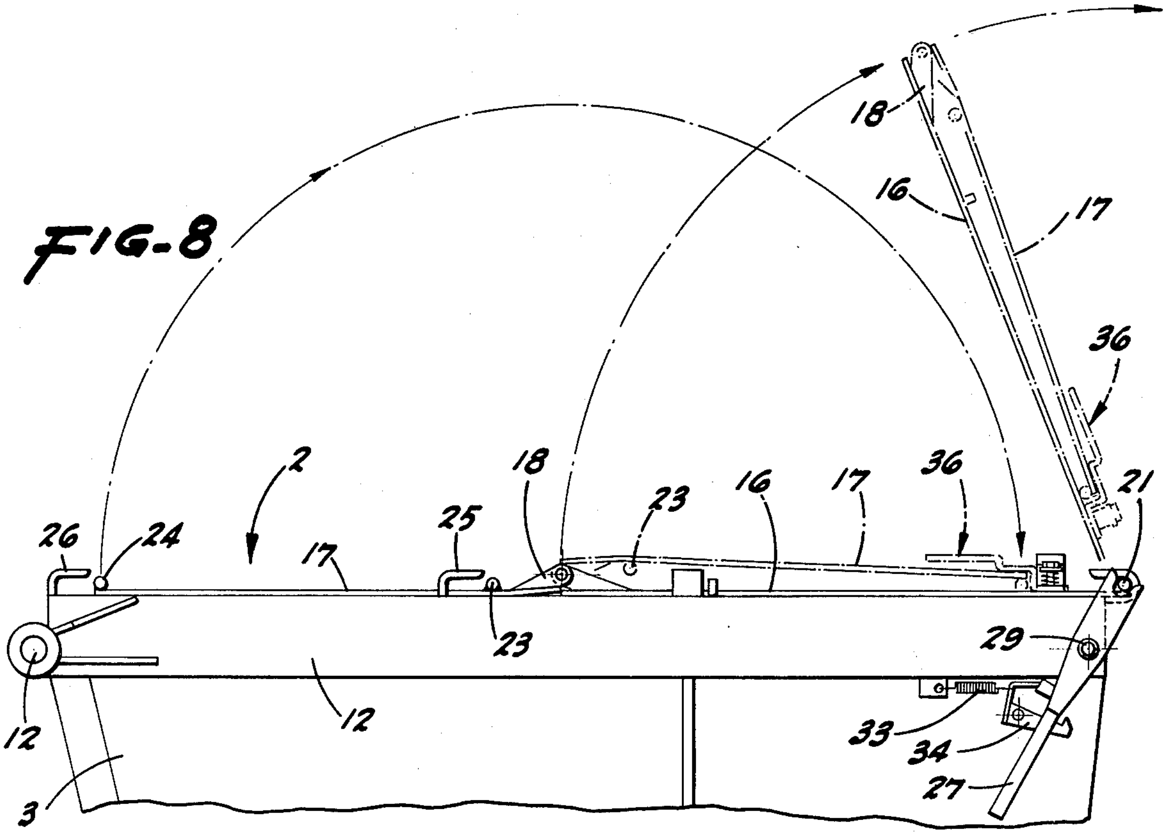

LID UNIT FOR A REFUSE COMPACTOR

BACKGROUND OF THE INVENTION

1. Field of the Invention

In refuse compactors, of the type which include a bin having a power-actuated compacting blade therein, provision must be made for the included lid to be incapable of opening when the compacting blade is in operation, while otherwise providing for the lid or a section thereof to be opened for placement of refuse in the bin, and for the lid at another time to be wholly opened and disposed so that the entire bin can be engaged and partially inverted by the power mechanism of a hauling truck, and into which truck the bin then dumps. Efforts to provide such a lid without mechanical complexity, and yet a lid which can be readily and conveniently manipulated, have not been without substantial problems. The present invention was conceived in a successful effort to produce a lid which avoids such problems and meets the above criteria.

2. The Prior Art

U.S. Pat. Nos. 3,301,414; 3,625,140; 3,680,478; 3,861,298 and 3,961,573 represent the most relevant prior art known to applicant.

The above prior art—considered singly or together—does not anticipate, nor suggest as obvious, the particular structure and function of the herein-claimed lid unit for a refuse compactor, and applicant has no knowledge of any prior art disclosing such particular structure and its function.

SUMMARY OF THE INVENTION

The present invention provides, as a major object, a lid unit for a refuse compactor of the type which includes a bin having a power-actuated compacting blade therein; the lid unit comprising—in novel combination—a flat, dual-section lid supported on the bin in normally closing relation thereto, the lid embodying a front section and a rear section transversely hinged together at adjacent edges, the lid being longitudinally shiftable a limited distance on the bin to different selective positions, and instrumentalities provided between the lid and the bin arranged to prevent opening of either of the lid sections when the lid is in one position, to permit the front lid section only to be opened when the lid is in a second position, and to permit the rear lid section to be folded onto the front lid section and the folded-together sections then swung to depend in front of the bin when the lid is in a third position.

The present invention provides, as another important object, a lid unit—as in the preceding paragraph—wherein the prevention of opening of either of the lid sections is for safety during operation of the compacting blade; the opening of only the front lid section is for the purpose of depositing refuse into the bin; and the folding of the lid sections and, as folded, their dependency in front of the bin is to allow the then open-top bin to be engaged and partially inverted for dumping into a hauling truck.

The present invention provides, as a further object, a lid unit for a refuse compactor which is designed for ease and economy of manufacture.

The present invention provides, as a still further object, a practical, reliable, and durable lid unit for a refuse compactor, and one which is exceedingly effective for the purpose for which it is designed.

BRIEF DESCRIPTION OF THE DRAWINGS

FIG. 7 is a fragmentary side outline, with the lid unit positioned for deposit of refuse into the bin of the compactor.

FIG. 8 is a similar view, but with the lid unit folded preparatory to dumping of a load from the bin.

DESCRIPTION OF THE PREFERRED EMBODIMENT

Figure 1:
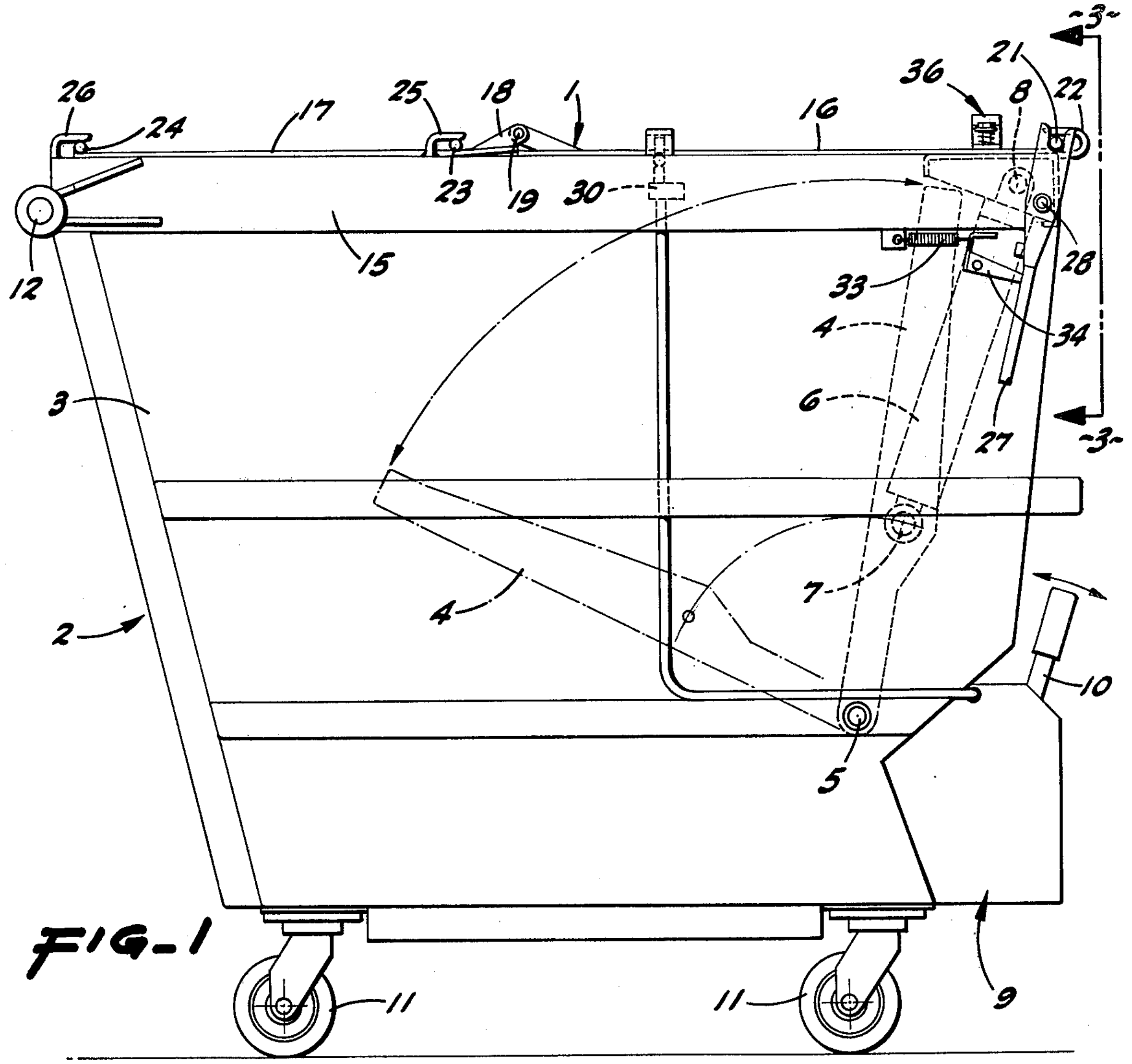
FIG. 1 is a side elevation of the refuse compactor, with the lid unit as positioned for a packing operation.
Figure 2:
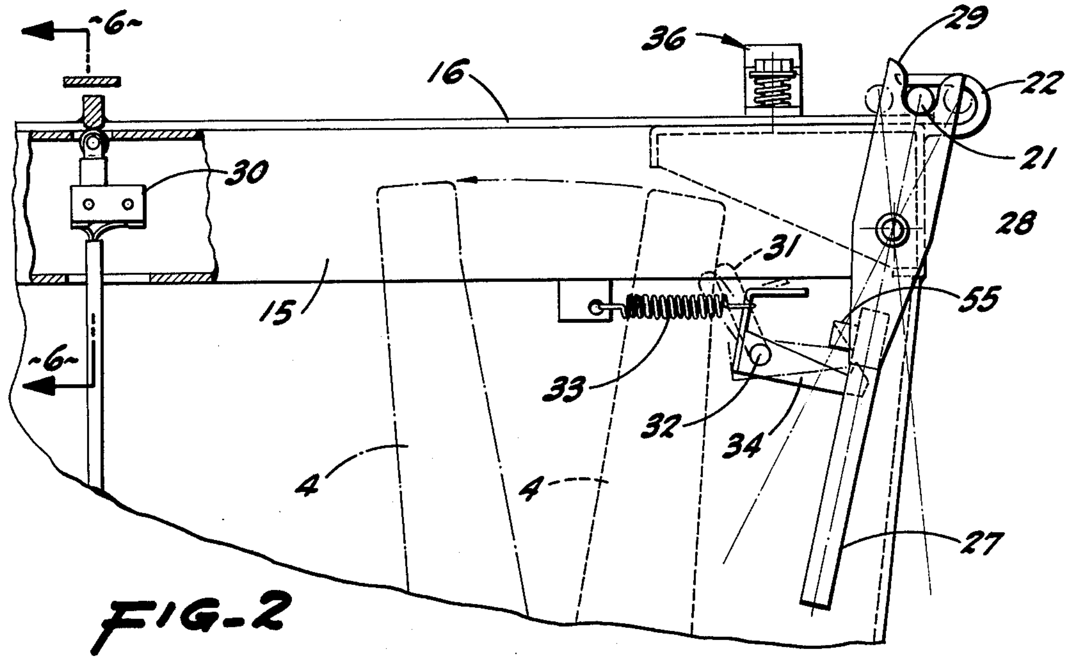
FIG. 2 is an enlarged fragmentary elevation of the same side of the compactor; the view being partly in section.
Figure 3:
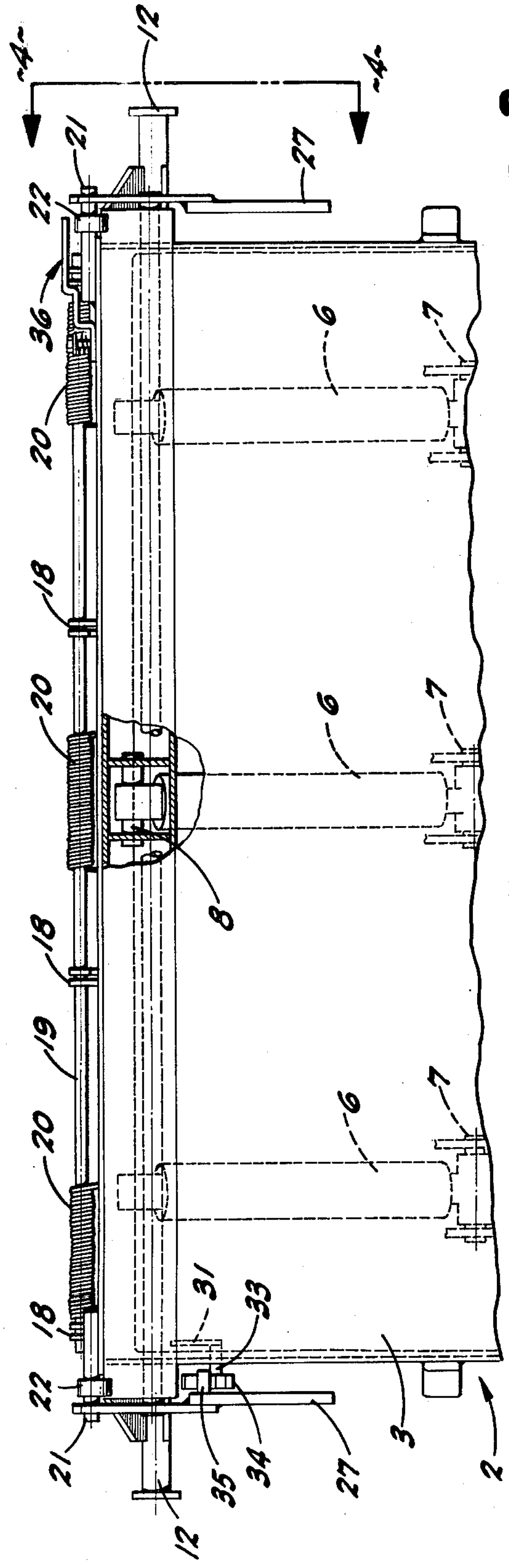
FIG. 3 is a fragmentary front elevation of the compactor; the view being taken substantially on line 3—3 of FIG. 1.
Figure 6:
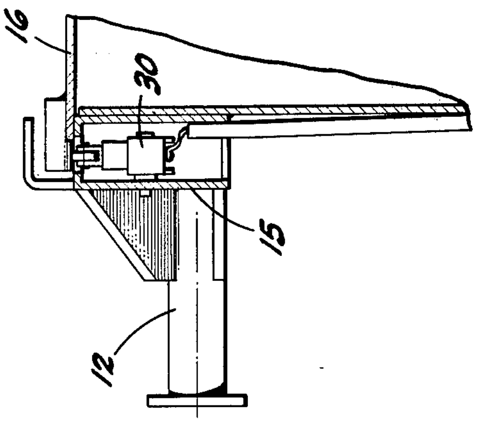
FIG. 6 is a fragmentary transverse section taken substantially on line 6—6 of FIG. 2.
Figure 5:
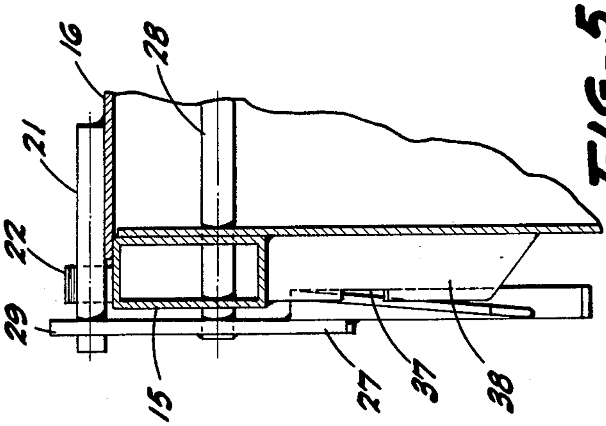
FIG. 5 is a fragmentary transverse section taken substantially on line 5—5 of FIG. 4.
Figure 4:
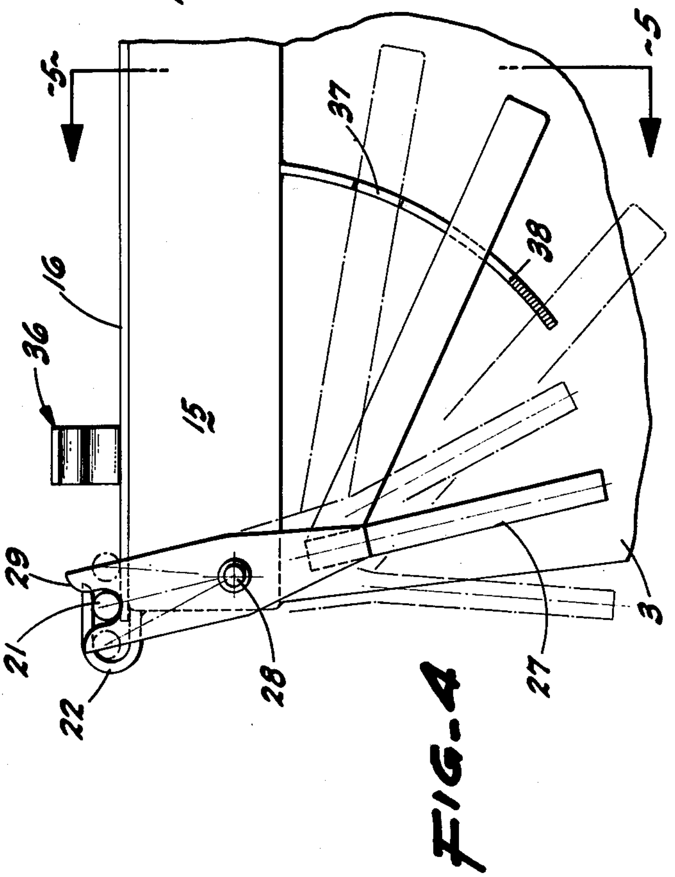
FIG. 4 is an enlarged fragmentary side elevation opposite FIG. 1; the view being taken substantially on line 4—4 of FIG. 3.

Referring now more particularly to the drawings and to the characters of reference marked thereon, the lid unit, of the present invention, is indicated generally at 1 and is here shown as employed on a portable-type refuse compactor, indicated generally at 2; such compactor 2 being of the kind which includes a bin 3 whose initially open top is normally closed by the lid unit 1. A refuse compacting blade 4 normally upstands in the bin adjacent the front thereof; such blade, pivoted adjacent the bottom of the bin as at 5, being adapted to be pivotally and forcefully swung rearwardly in the bin in compacting relation to refuse deposited therein. The blade 4 is so swung, and subsequently retracted, by a plurality of upstanding, double-acting, transversely-spaced, fluid pressure power cylinders 6 pivoted at their lower ends, as at 7, to the blade 4 and pivoted at their upper ends, as at 8, to the bin at the top-front thereof. The power cylinders 6 are simultaneously actuated, reversibly, from an electric motor driven, fluid pressure power unit, indicated generally at 9, mounted on the front of the compactor and including a manual control lever 10. Caster wheels 11 support the bin 3 for ready manual movement, and the bin is provided at the top-rear corners with laterally outwardly projecting, headed trunnions 12 adapted for engagement by the power dumping mechanism 13 of a conventional hauling truck 14 as later described.

The bin 3, of the refuse compactor, as above described, is of generally known construction and includes—on each side and at the top—longitudinal beams 15 which support the lid unit 1; the latter being constructed, and used, as follows:

The lid unit 1 comprises two rectangular sections, a front section 16 and a rear section 17 disposed in adjacent edge-to-edge relation and normally lying flat and closing the top of the bin. The sections 16 and 17 are hinged together as at 18; the hinge assembly including a common transverse shaft 19 associated with torsion countersprings 20 which aid in manual opening movement of the front lid section 16 relative to the rear lid section 17. The lid unit 1 is slidably supported on the top-side beams 15 for limited lengthwise shifting movement for the reason hereinafter explained.

On the sides of the lid unit 1 and on the related top beams 15, the following arrangement is provided:

Trunnions 21 project laterally outwardly from the sides of the front section 16 at the front of the latter, and such trunnions are normally engaged approximately midway in corresponding, rearwardly opening, elongated hooks 22 fixed on the beams 15. Front and rear trunnions, 23 and 24 respectively, project laterally outwardly from the sides of the rear section 17 much the same as trunnions 21, and such trunnions 23 and 24 are normally engaged approximately midway in corresponding front and rear, forwardly facing, elongated hooks 25 and 26, respectively, fixed on the beams 15.

The lid unit 1, as supported by the beams 15, is longitudinally slidable thereon through a limited range. Such sliding or shifting motion—either rearwardly or forwardly—is accomplished by means of upstanding, manually operative levers 27 disposed on opposite sides of bin 3 and attached intermediate their ends to a turntable cross shaft 28 whereby swinging of one such lever causes corresponding movement of the other. At their upper ends, the hand levers 27 are each formed with a fork 29 which straddles the extended end portion of the corresponding trunnion 21. Thus, swinging of the hand levers forwardly or rearwardly at their lower ends causes—by means of forks 29 and trunnions 21—rearward or forward shifting, respectively, of the lid unit 1 on the bin 3.

In order for a person to deposit refuse in the bin 3, the lid unit 1 is—by manipulation of one of the hand levers 27—shifted rearwardly a distance such that the trunnions 21 escape the hooks 22, whereupon the front section 16 is manually lifted—about hinges 18—to an open position (see FIG. 7) and the refuse dropped into the bin. The trunnions 23 and 24 of the rear section 17 remain in hooks 25 and 26 and merely move rearwardly therein when the lid unit is shifted rearwardly, as above, to permit the front section 16 to be opened.

After the front section 16 is reclosed, the lid unit 1 is shifted forwardly, by hand lever operation, until the trunnions re-engage in hooks 22, and at which time the trunnions 23 and 24 remain in the hooks; the lid unit then being in its normal position (see FIG. 1) with sections 16 and 17 non-openable.

Nextly, with the power unit 9 in operation, and by manipulation of control lever 10, the power cylinders 6 are extended to swing the compacting blade rearwardly to compact the refuse in the bin and then contracted to return the blade forwardly to its starting position in the bin.

As a safety measure, the power unit 9 cannot be operated with the front section 16 in an open position; this by reason of the inclusion of a switch 30 interposed in the electric circuit for power unit 9, and which switch (normally held closed by front section 16) self-opens when said section 16 is raised upwardly from its normally closed position.

As a further safety measure, an automatic holding arrangement is provided whereby the hand levers 27 are held against movement—in a direction to shift the lid unit rearwardly—when the compacting blade 4 starts to move rearwardly in the bin; such holding arrangement being associated with the bin on one side and adjacent the related hand lever 27. More particularly, when the blade starts to move rearwardly, it releases a radial holding finger 31 on a short, throughside shaft 32 which thence part-turns under the influence of a spring 33, whereupon a catch 34 on the shaft moves into engagement with a member 35 on the adjacent hand lever 27 and which prevents the latter from being swung in a direction to shift the lid unit rearwardly. Upon return of blade 4 to its starting position, the holding finger 31 is engaged and returned to a position which causes catch 34 to clear the hand lever.

When it is desired to empty the bin 3 of the compacted refuse therein, the lid unit 1 is first hand-lever shifted forwardly a distance such that the trunnions 23 and 24 escape the hooks 25 and 26, respectively; the trunnions 21 remaining, however, in the hooks 22.

Nextly, the rear section 17 is manually folded forwardly about hinges 18 and onto the front section 16 in substantially flush or "sandwich-like" relation; the folded-together sections then being held together by a manual turn device 36 pivoted on the front portion of section 16.

Figure 9:
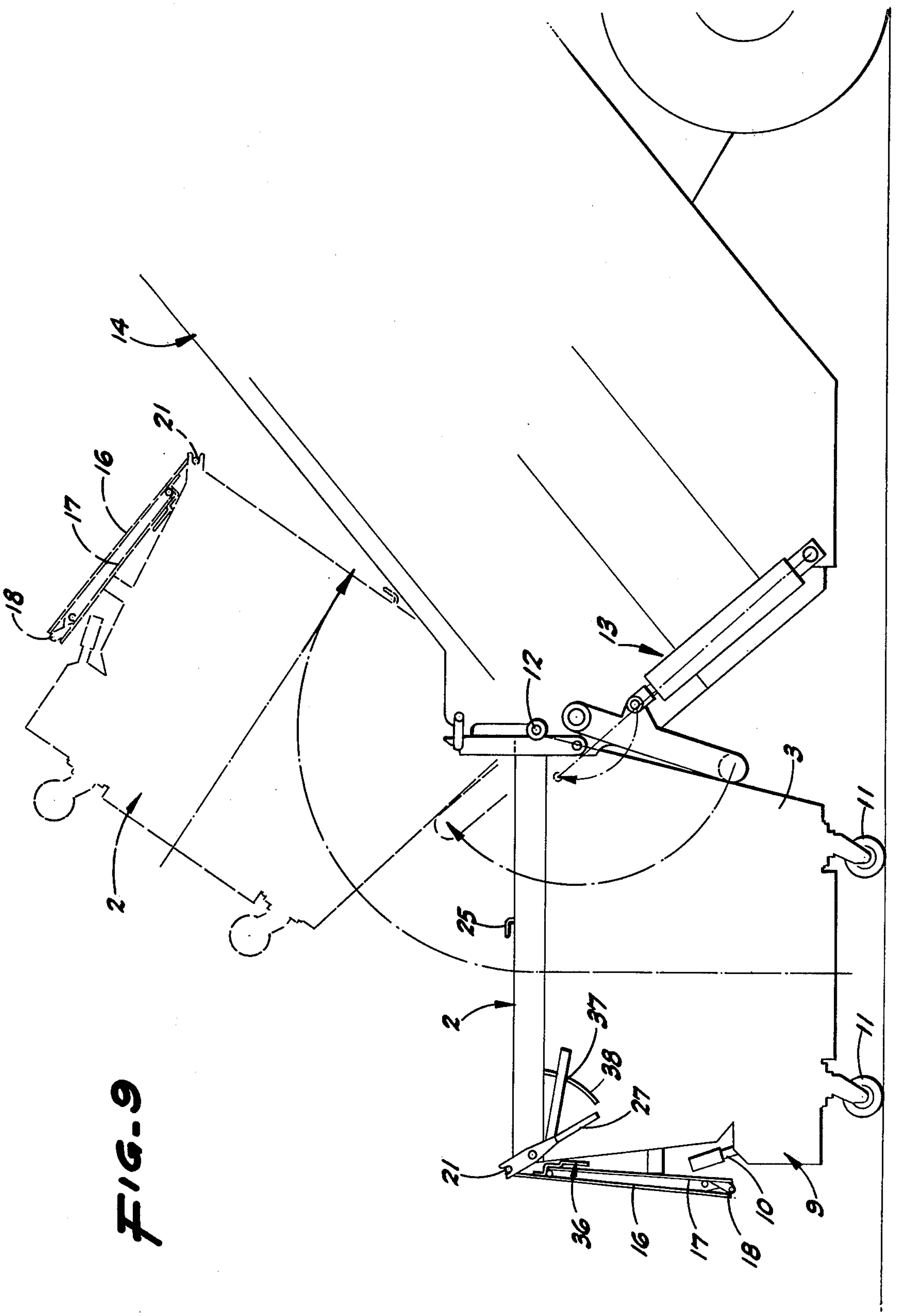
FIG. 9 is a side outline showing the path of movement of the compactor as lifted—and to a partially inverted, bin-discharging position—by the power dumping mechanism of a conventional hauling truck.

Thereafter, the folded-together sections 16 and 17 are manually swung upwardly and forwardly about the trunnions 21 as an axis (see FIG. 8), and are then permitted to gravitationally depend from such trunnions. See the full line showing of the folded, depending sections 16 and 17 in FIG. 9.

Finally, the bin 3 is engaged at the rear by the power dumping mechanism 13 of a rear loading refuse hauling truck 14; the mechanism 13—which is conventional, abuts the bin, and couples with the headed trunnions 12—acts to swing the entire compactor 2 upwardly and over to a partially inverted position of the bin 3 (shown in broken lines in FIG. 9), whereupon the pre-compacted refuse in said bin 3 falls free therefrom and dumps into the truck 14.

To assure that trunnions 21 remain in hooks 22 during the above dumping operation, the related one of the hand levers 27 is snap-engaged in a notch 37 of a holding quadrant 38 mounted on the bin on the side remote from catch 34.

After the contents of the bin have been dumped into the truck 14, the compactor is, of course, returned to its ground-engaging, caster-supported position; the quadrant-engaging hand lever is released; and the lid is unfolded flat on the bin and then shifted to its normal position with trunnions 21, 23, and 24 engaged in the corresponding hooks.

The lid unit, constructed as described, is capable of easy and ready manipulation for the purposes described, with safety not only to the user who opens the front section 16 to deposit refuse in the bin, but also safety to the persons who must fold and reposition the lid unit preparatory to a bin-dumping operation.

From the foregoing description, it will be readily seen that there has been produced such a lid unit for a refuse compactor as substantially fulfills the objects of the invention as set forth herein.

While this specification sets forth in detail the present and preferred construction of the lid unit for a refuse compactor, still in practice such deviations from such detail may be resorted to as do not form a departure from the spirit of the invention as defined by the appended claims.

I claim:

1. A lid unit, for a refuse compactor including a bin having a power-actuated compacting blade therein, comprising a flat, dual section lid supported on the bin in normally closing relation thereto, the lid embodying a front section and a rear section, means transversely hinging the front section and rear section at adjacent edges, the lid being longitudinally shiftable a limited distance on the bin to different selective positions, instrumentalities provided between the bin and lid arranged to prevent opening of either of the lid sections when the lid is in one position, to permit the front lid section only to be opened when the lid is in a second position, and to permit the rear lid section to be folded onto the front lid section and the folded-together sections swung to depend in front of the bin when the lid is in a third position, and means to shift the lid to said selective positions.

2. A lid unit, as in claim 1, in which said shifting means includes a hand lever on the bin, and a connection between the hand lever and the lid operative to cause shifting of the lid to said positions in response to related swinging of said hand lever.

3. A lid unit, as in claim 2, in which the hand lever upstands, and is pivoted intermediate its ends, at one side of the bin, and said shifting means includes a laterally projecting trunnion on the lid, the hand lever being formed at its upper end with a fork, and the fork straddling the trunnion.

4. A lid unit, as in claim 3, including means on the bin adapted for releasable engagement by the hand lever whereby to hold the latter and the lid against motion when said lid is in such third position, folded, and depending in front of the bin.

5. A lid unit, as in claim 1, in which said means comprises a rotatable cross shaft on the bin at the front, an upstanding hand lever mounted intermediate its ends on each end of the cross shaft adjacent and exteriorly of the corresponding side of the bin, the upper end portion of each hand lever being formed with a fork, and a trunnion projecting laterally from each side of the front lid section and engaged in the corresponding fork.

6. A lid unit, as in claim 1, in which said instrumentalities include trunnions projecting laterally from the front and rear lid sections, rearwardly opening hooks on the bin disposed for reception of the trunnions on the front lid section, and forwardly opening hooks on the bin disposed for reception of the trunnions on the rear lid section; the trunnions and hooks being positionally related so that the trunnions on both sections are engaged in corresponding hooks when the lid is in said one position, only the trunnions on the front lid section being clear of the corresponding hooks when the lid is in said second position, and only the trunnions on the rear lid section being clear of the corresponding hooks when the lid is in said third position.

7. A lid unit, as in claim 6, in which the hooks are elongated and the trunnions of both the front lid section and rear lid section are disposed midway in the corresponding hooks when the lid is in said one position.

8. A lid unit, as in claim 6, in which a trunnion projects laterally from each side of the front lid section at the front of the latter; said front lid section trunnions providing the pivotal axis for the folded-together lid sections when swung to depend in front of the bin.

9. A lid unit, as in claim 8, in which at least one of the front lid section trunnions is end-extended laterally outwardly beyond the corresponding hook; and the means to shift the lid cooperatively engages with such end-extended portion of said one trunnion.

10. A lid unit, as in claim 9, in which the means to shift the lid includes a hand lever upstanding, and pivoted intermediate its ends, at the side of the bin corresponding to such end-extended portion of said one trunnion; the hand lever being formed at its upper end with a fork, and the fork straddling said end-extended trunnion portion.

11. A lid unit, as in claim 6, in which a trunnion projects laterally from each side of the front lid section at the front thereof; a trunnion projects laterally from each side of the rear lid section at the front thereof; and a trunnion projects laterally from each side of the rear lid section at the rear thereof.

12. A lid unit, as in claim 11, in which the hooks corresponding to the trunnions of both lid sections are elongated, and the trunnions engaging only partway in the corresponding hooks when the lid is in said one position.

13. A lid unit, as in claim 1, including means associated with and adapted to automatically prevent operation of the lid-shifting means during power actuation of the compacting blade in the bin.

14. A lid unit, as in claim 1, in which the lid-shifting means includes a rotatable cross shaft on the front of the bin, a hand lever fixed intermediate the ends thereof on each end of the cross shaft, the hand levers upstanding at the side of the bin, each hand lever being formed at its upper end with a fork, and a trunnion projecting laterally from each side of the front lid section, the corresponding fork straddling each such trunnion.

15. A lid unit, as in claim 14, including catch means associated with at least one of the hand levers adapted to automatically prevent operation of said hand lever during power actuation of the compacting blade in the bin.

* * * * *